United States Patent
Kreider

[15] 3,699,623
[45] Oct. 24, 1972

[54] METHOD FOR FABRICATING CORROSION RESISTANT COMPOSITES

[72] Inventor: Kenneth G. Kreider, Glastonbury, Conn.

[73] Assignee: United Aircraft Company, East Hartford, Conn.

[22] Filed: Oct. 20, 1970

[21] Appl. No.: 82,252

[52] U.S. Cl.............29/156.8 B, 29/156.8 P, 29/419, 29/498, 29/DIG. 45, 416/224, 416/230, 416/241
[51] Int. Cl..........................B23p 15/02, B23p 15/04
[58] Field of Search ....29/156.8 B, 156.8 P, 156.8 H, 29/419, 498, DIG. 45, 471.1; 416/224, 229, 230, 241 A

[56] References Cited

UNITED STATES PATENTS 3,572,971  3/1971  Seiwert......................416/230
3,600,103  8/1971  Gray et al. ..............416/230 X
2,982,017  5/1961  Drummond..............29/498 X
3,041,040  6/1962  Levinstein.............29/156.8 B
3,098,723  7/1963  Micks.....................29/156.8 B
3,165,829  1/1965  Wardlaw..................29/498 X
3,460,920  8/1969  Long et al. ............29/419 UX Primary Examiner—John F. Campbell
Assistant Examiner—Donald C. Reiley, III
Attorney—John D. Del Ponti

[57]  ABSTRACT

A method for fabricating erosion and corrosion resistant filament reinforced composite articles having a matrix of aluminum or magnesium or alloys thereof for use in gas turbine engines wherein a protective sheath of titanium foil is diffusion bonded to the outer surface of the matrix.

4 Claims, 1 Drawing Figure

PATENTED OCT 24 1972 3,699,623
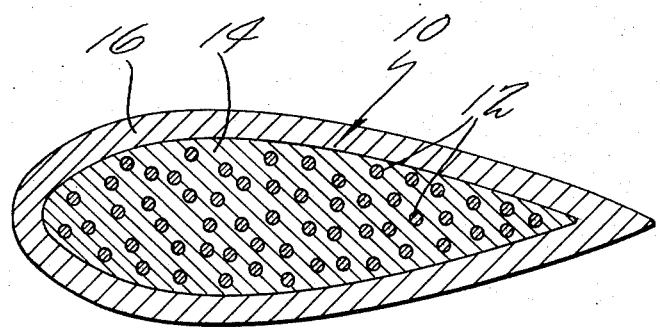
INVENTOR
KENNETH G. KREIDER
BY John DeSoti
ATTORNEY

METHOD FOR FABRICATING CORROSION RESISTANT COMPOSITES

BACKGROUND OF THE INVENTION

It is known to fabricate fiber reinforced articles of, for example, filamentary boron in an aluminum or magnesium matrix, for usage as components in gas turbine engine applications. For a detailed discussion of one such technique see my copending application Ser. No. 763,278 filed on Sept. 27, 1968, now U.S. Pat. No. 3,606,667, and assigned to the same assignee as the present invention. Primarily because of the nature of the materials and the environment of their application, these fiber-reinforced components have not enjoyed long operating lives. On the contrary, they are prone to erosion and degradation in the early stages of use, thus necessitating tedious expensive replacement and diminishing their potential commercial feasibility.

SUMMARY OF THE INVENTION

This invention relates to a technique for significantly improving erosion and corrosion resistance of composite gas or steam turbine engine components. More particularly, the present invention contemplates a method for protecting fiber-reinforced aluminum or magnesium matrix composite components such as fan or compressor blades from erosion and corrosion by sheathing the same in a foil skin of titanium or titanium alloy, typically 4 to 20 mils in thickness. In the process, the protective titanium skin is initially plasma sprayed with a layer of the blade matrix alloy and then diffusion bonded to the matrix outer surface of the component.

The important advantage of plasma spraying the titanium with a layer of aluminum or magnesium resides in the significantly enhanced bondability characteristics given the foil. Diffusion bonding of aluminum, for example, requires the removal of the oxide layer present on the aluminum and, as will be appreciated, one of the best ways to achieve its removal is through plastic deformation. By plasma spraying a porous layer of the matrix alloy onto the titanium foil, the oxide break up is facilitated in situ since the porosity is collapsed without any extensive gross deformation required.

In addition to providing excellent corrosion resistance to the composite component, the provision of a bonded titanium skin results in increased torsional rigidity and strength as well as increased modulus and strength in non-fiber reinforced directions.

BRIEF DESCRIPTION OF THE DRAWING

An understanding of the invention will become more apparent to those skilled in the art by reference to the following detailed description when viewed in light of the drawing, which is an elevational view, in section, of the airfoil portion of a gas turbine engine blade.

DESCRIPTION OF THE PREFERRED EMBODIMENT

In composite structures for gas turbine engine applications, it has been found that particularly attractive and high strength-to-weight ratio composites may be made by laying up a plurality of monolayer tapes of silicon carbide coated boron filaments in an aluminum matrix. Such tapes, as hereinbefore noted, are discussed in detail in copending application Ser. No. 763,278, and have been fabricated into gas turbine engine blades, as for example fan blades. It should be noted that other filaments such as silicon carbide or plain boron or the like may be used in a matrix of aluminum or magnesium or their alloys.

As shown in the drawing, a blade 10 is comprised so as plurality of silicon carbide coated boron reinforcing filaments 12, such as those 4 mil filaments sold by Hamilton Standard Division of United Aircraft Corporation under the registered trademark BORSIC, embedded in a matrix 14 of aluminum, such as 6061 aluminum alloy. The blade 10 is protected with a titanium foil covering 16 which is bonded to the blade.

In the process, the titanium skin is first plasma sprayed with the blade matrix alloy in order to ensure bondability and is then diffusion bonded to the filament reinforced composite by the application of heat and pressure. As will be appreciated by those skilled in the art, plasma spraying is preferably accomplished in a plasma spray chamber where deposition of the metal matrix material by means of a plasma torch can be achieved in an argon atmosphere. Prior to spraying, a sheet of titanium foil is disposed on a mandrel and preheated to a temperature sufficiently high to assure bonding to the matrix during plasma spraying. With titanium foil, a temperature between about 400° and 600° F results in good adherence while a temperature below 200° F generally results in non-adherence. During spraying, the mandrel is rotated and traversed in front of the plasma arc, which is maintained stationary, in order to obtain an even layer of matrix material thereon. It has been found that a plasma sprayed as low as 1 mil thick will cause subsequent satisfactory bonding of the foil to the structural composite. Variables which affect the plasma flame include the power input to the arc, the geometry and size of the arc electrodes and the composition and flow rate of the plasma gas. Deposits may be made with 400–500 amperes, 30–35 volts and 140–160 cu. ft./hr. STP of argon. Further, the deposit is affected by the rate of powder feed, the position of the powder feed inlet hole of the plasma, the size distribution of the powder, the torch to substrate distance, the nature of atmosphere surrounding the plasma exhaust flame and the substrate, and the substrate temperature. Satisfactory deposits may be made with a moderate feed rate with respect to saturation (3 pounds per hour of metal powder spray), the powder inlet located in the ionizing zone of the arc, −240+400 mesh size spherical metal powder, a 4-to-5 inch arc to substrate distance, an argon atmosphere, a substrate temperature of 400°–600° F and a relative velocity range of the plasma spray arc across the substrate of 2- to-8 inches per second.

After spraying, the titanium foil is allowed to cool to room temperature and is then removed from the mandrel. Once the sprayed foil is removed, it is diffusion bonded to the structural composite by hot pressing in a non-oxidizing atmosphere. The hot press diffusion bond is preferably done under conditions at which no continuous brittle intermetallic is formed, typically at temperatures of 450°–550° C for 1 hour.

As indicated hereinbefore, the preliminary plasma spray step promotes the subsequent diffusion bond since oxide break up is achieved in situ as the porosity is collapsed without extensive gross deformation required. Aluminum boron composites have been satisfactorily bonded to CP titanium foil as well as Ti6A14V alloy foil by plasma spraying either aluminum-copper (2024), aluminum-magnesium (6061), aluminum-silicon (4343) or CP aluminum. These composites have demonstrated interlaminar shear strengths greater than 9,000 psi and excellent static and fatigue strength. Similar results were observed with magnesium as the matrix materials.

In one series of tests, an SS White grit blaster was operated at 90 psi from a distance of 3 inches from multilayer laminations of Borsic reinforced 6061 aluminum alloy composite (50 volume percent of filament) in order to compare erosion and corrosion resistance. After 30 seconds, the grit blaster cut through six layers of the unprotected Borsic - 6061 composite whereas after the same length of time, no damage was apparent on the samples protected by titanium alloy 0.004 inch foil.

In another series of tests, the properties set forth in the following table were found following the bonding of 4 mil Ti6A14V protective foil at 550° C for 1 hour at 8,000 psi to a multilayer structural composite comprised of Borsic reinforced 6061 aluminum alloy (50 v/o) monolayer tapes of uniaxial orientation diffusion bonded together.

TABLE I

Properties of Laminated Borsic — Aluminum (6061)

| Sample No. | Axial Ultimate Tensile Strength | Young's Modulus (X 10⁶ psi) | Ti6A14V Cladding thickness | Transverse Ultimate Tensile Strength (psi) |
|---|---|---|---|---|
| 1 | 150,000 | 30.4 | 11% | |
| 2 | 148,000 | 29.9 | 11% | |
| 3 | 163,000 | 29.5 | 11% | |
| 4 | 164,000 | 28.0 | 11% | |
| 5 | | | 12% | 67,100 |
| 6 | | | 12% | 60,000 |

What has been set forth above is intended primarily as exemplary to enable those skilled in the art in the practice of the invention and it should therefore be understood that, within the scope of the appended claims, the invention may be practiced in other ways than as specifically described.

What is claimed is:

1. In a method for fabricating filament reinforced composite articles having a matrix of aluminum or magnesium or alloys thereof for use in a gas turbine engine, the improvement which comprises diffusion bonding titanium foil to the outer surface of said matrix to protect said articles from erosion and corrosion during use.

2. The method of claim 1 wherein the titanium foil, prior to diffusion bonding, is plasma sprayed with a porous layer of matrix material on one side and said diffusion bonding is effected by covering the composite article with said foil with said one side disposed contiguous thereto, and applying heat and pressure.

3. The method of claim 2 wherein the heat generated is 450°–550° C.

4. The method of claim 3 wherein the titanium foil is 4–20 mils thick and the porous layer of matrix material is at least 1 mil thick.

* * * * *